United States Patent [19]

Kittilson et al.

[11] Patent Number: 6,078,452
[45] Date of Patent: Jun. 20, 2000

[54] DISK DRIVE EMPLOYING METHOD OF WRITING A DATA BLOCK TO A DATA SECTOR FOLLOWING A DEFECTIVE SERVO SECTOR

[75] Inventors: Greg Kittilson; Mark Schibilla; Timothy W. Swatosh, all of Rochester, Minn.

[73] Assignee: Western Digital Corporation, Irvine, Calif.

[21] Appl. No.: 09/102,982

[22] Filed: Jun. 22, 1998

[51] Int. Cl.[7] .................................................. G11B 27/22
[52] U.S. Cl. ............................ 360/51; 360/31; 360/77.08
[58] Field of Search .................................. 360/75, 69, 53, 360/51, 31, 60, 77.02, 77.08

[56] References Cited

U.S. PATENT DOCUMENTS

| | | | |
|---|---|---|---|
| 4,412,165 | 10/1983 | Case et al. | 360/77.08 X |
| 4,805,046 | 2/1989 | Kuroki et al. | 360/51 X |
| 5,153,784 | 10/1992 | Kitamura | 360/60 |
| 5,153,788 | 10/1992 | Nishikawa et al. | 360/51 X |
| 5,434,725 | 7/1995 | Hirose et al. | 360/77.04 |
| 5,710,677 | 1/1998 | Teng et al. | 360/77.08 |
| 5,798,883 | 8/1998 | Kim | 360/31 |
| 5,959,797 | 9/1999 | Imai et al. | 360/51 |

*Primary Examiner*—Paul Loomis
*Assistant Examiner*—James L Habermehl
*Attorney, Agent, or Firm*—Milad G. Shara

[57] ABSTRACT

A disk drive employs a method for writing a block of data (or multiple blocks of data) to a data region following a defective servo sectors. The disk drive includes a sampled head positioning servo system and a rotating disk with a plurality of data tracks on a surface of the disk. Each data track has multiple spaced-apart sequentially-active servo sectors. Data regions are disposed between the servo sectors. The method includes the step of executing a command to perform a write operation to write a data block to a target data region. A defective servo sector $S_n$ is encountered preceding the target data region during the write operation. The defective servo sector $S_n$ precedes a servo sector $S_{n+1}$ and follows a servo sector $S_{n-1}$. A timer interval is set to enable a first detection window $Dw_{n+1}$ for detecting a field in servo sector $S_{n+1}$. If the field is detected within the detection window $Dw_{n+1}$, a field is detected within a detection window $Dw_{n-1}$ for the servo sector $S_{n-1}$. The data block is written in the target data region following the defective servo sector $S_n$ based on detecting the field within the detection window $Dw_{n-1}$ for the servo sector $S_{n-1}$. A timer interval is set to enable a second detection window $Dw_{n+1}$ for detecting a field in the servo sector $S_{n+1}$. If the field in the servo sector $S_{n+1}$ is detected within the second detection window $Dw_{n+1}$, the data block is marked as being successfully written.

21 Claims, 7 Drawing Sheets

DISK DRIVE EMPLOYING METHOD OF WRITING A DATA BLOCK TO A DATA SECTOR FOLLOWING A DEFECTIVE SERVO SECTOR

BACKGROUND OF THE INVENTION

1. Field of the Invention

The present invention relates to disk drives. More particularly, the present invention relates to a disk drive employing method of writing a block of data to a data region following detection of a defective servo sector.

2. Description of the Prior Art

Hard disk drives store large volumes of data on one or more disks mounted on a spindle assembly. Disk drives employ a disk control system for interfacing with a host (e.g., a computer) to control the reading and writing of data on a disk. Each disk includes at least one disk surface which is capable of storing data. On each disk surface, user data is stored in concentric circular tracks between an outside diameter and an inside diameter of the disk. Servo systems are employed to maintain alignment of a transducer head with a desired target data track (termed "track following"), for reading and writing user data on the disk surface within desired control parameters.

Embedded servo systems store servo data on the same disk surface as user data to provide control signals and information employed in the operation of the servo system. User data on the disk surface is divided into groups of data sectors. Embedded servo information is recorded in servo sectors placed in radially continuous narrow wedges between the groups of data sectors. In this regard, servo sectors are commonly referred to as "servo wedges". For example, a concentric data track may include 60 equally spaced servo sectors with data regions (i.e., a region containing data sectors, groups of data sectors or partial data sectors) located between adjacent servo sectors.

Each servo sector includes track identification and tracking information used in track seeking and following operations. For example, the track identification information may include track number or address and sector number, and the tracking information may include a field for establishing automatic gain control (AGC) and phase lock oscillator information (PLO) settings, timing information (e.g. a servo sync word) and servo burst information for positioning a transducer head over the disk surface.

During execution of a command to read or write data to a target data sector on the disk surface, servo information is sampled each time a servo sector passes under the associated transducer head. Sector timing is maintained by detecting a servo sync word field for each servo sector within a timing window, wherein the timing window is set based on detection of the previous servo sync word field within a previous servo sector.

If the servo system does not detect a servo sync word within the timing window for the servo sector preceding the target data sector, a servo sync word timeout signal is generated and the servo processor may indicate that writing is unsafe (i.e., inhibits write gate) due to a defective servo sector or motor speed variation. With write gate disabled, user data is not written to the disk surface.

The servo sector may be defective due to a transient error or a "hard" sector error. A transient error is defined as an error or defect which clears over a period of time. For example, a transient error may occur due to a thermal asperity on the disk surface. A retry mode may be entered, wherein the command is retried a number of times allowing sufficient time to pass for the transient error to clear. A hard sector error conversely is not transient in nature. Hard sector errors include defects in the disk surface, which may be a result of the manufacturing process or handling of the disk drive. Hard sector errors are more permanent in nature, and do not clear using the retry process, therefore the sector in question is a defective servo sector.

The existence of a defective servo sector may become known during manufacturing testing, or during customer use. If during manufacturing testing or during later operation of the disk drive a servo sector is found to be defective due to a hard sector error, the disk drive controller conventionally will not allow read or write commands to be executed which are directed to the data sectors located between the defective servo sector and a next consecutive servo sector. A defect management scheme may be utilized to reallocate the data sectors following the defective servo sector to a sparing region. To facilitate recovery from a sector error, data is allowed to be read from the data sectors following the defective servo sector. Because of the more critical nature of writing data on the disk surface, the occurrence of a defective sector during normal use conventionally requires re-allocation of data sectors following the defective servo sector to a sparing region elsewhere on the disk. In the case of a defective servo sector, the following data region may in fact be perfectly capable of storing data reliably, therefore re-allocation of the data sectors consumes a severely limited commodity in the disk drive, i.e. the sparing region.

There is a need for a more efficient way to handle the impact of a defective servo sector.

SUMMARY OF THE INVENTION

The invention can be regarded as a method of operating a disk drive having a sampled signal head positioning servo system and a rotating disk with a plurality of data tracks on a surface of the disk. Each data track has multiple spaced-apart sequentially-active servo sectors. Data regions are disposed between the servo sectors. The method includes the step of executing a command to perform a write operation to write a data block to a target data region. A defective servo sector $S_n$ is encountered preceding the target data region during the write operation. The defective servo sector $S_n$ precedes a servo sector $S_{n+1}$ and follows a servo sector $S_{n-1}$. A timer interval is set to enable a first detection window $Dw_{n+1}$ for detecting a field in the servo sector $S_{n+1}$. If the field is detected within the detection window $Dw_{n+1}$, a field is detected within a detection window $Dw_{n-1}$ for the servo sector $S_{n-1}$. The data block is written in the target data region following the defective servo sector $S_n$ based on detecting the field within the detection window $Dw_{n-1}$ for the servo sector $S_{n-1}$. A timer interval is set to enable a second detection window $Dw_{n+1}$ for detecting a field in the servo sector $S_{n+1}$. If the servo sync word in the servo sector $S_{n+1}$ is detected within the second detection window $Dw_{n+1}$, the data block is marked as being successfully written.

The invention can also be regarded as a disk drive having a disk control system including a sampled signal head positioning servo system and a head disk assembly including a rotating disk with a recording surface. The recording surface includes a plurality of data tracks wherein each data track has multiple spaced-apart sequentially-active servo sectors and data regions disposed between the servo sectors. The recording surface includes a target data region, a defective servo sector $S_n$ preceding the target data region, a servo sector $S_{n-1}$ preceding the defective servo sector $S_n$, and a servo sector $S_{n+1}$ following the defective servo sector $S_n$.

The disk drive further comprises means for executing a command to perform a write operation to write a data block to the target data region. Means are provided for detecting the servo sector $S_{n-1}$, the defective servo sector $S_n$ and the servo sector $S_{n+1}$ during the write operation. The means for detecting includes timing means for enabling a timing window in which to detect a servo sync word for each servo sector.

Wherein after the detecting means detects the servo sector $S_n$, the timing means enables a first detection window $Dw_{n+1}$ for detecting a field in the servo sector $S_{n+1}$. If the field is detected within the detection $Dw_{n+1}$, the detecting means detects a field within a detection window $Dw_{n-1}$ for the servo sector $S_{n-1}$. Means are provided for writing the data block to the target data region after the detection of the defective servo sector $S_n$, and the data block is written to the target data region following the defective servo sector $S_n$ based on the detected servo sync word within the servo sector $S_{n-1}$. The timing means enables a timer interval for detection of a second detection window Dwn+1 for detecting a field in the servo sector $S_{n+1}$. If the field in the servo sector $S_{n+1}$ is detected within the second detection window $Dw_{n+1}$, the disk control systems marks the data block as being successfully written.

The foregoing and other features of the invention are described in detail below and set forth in the appended claims.

DETAILED DESCRIPTION OF THE PREFERRED EMBODIMENTS

Figure 1:
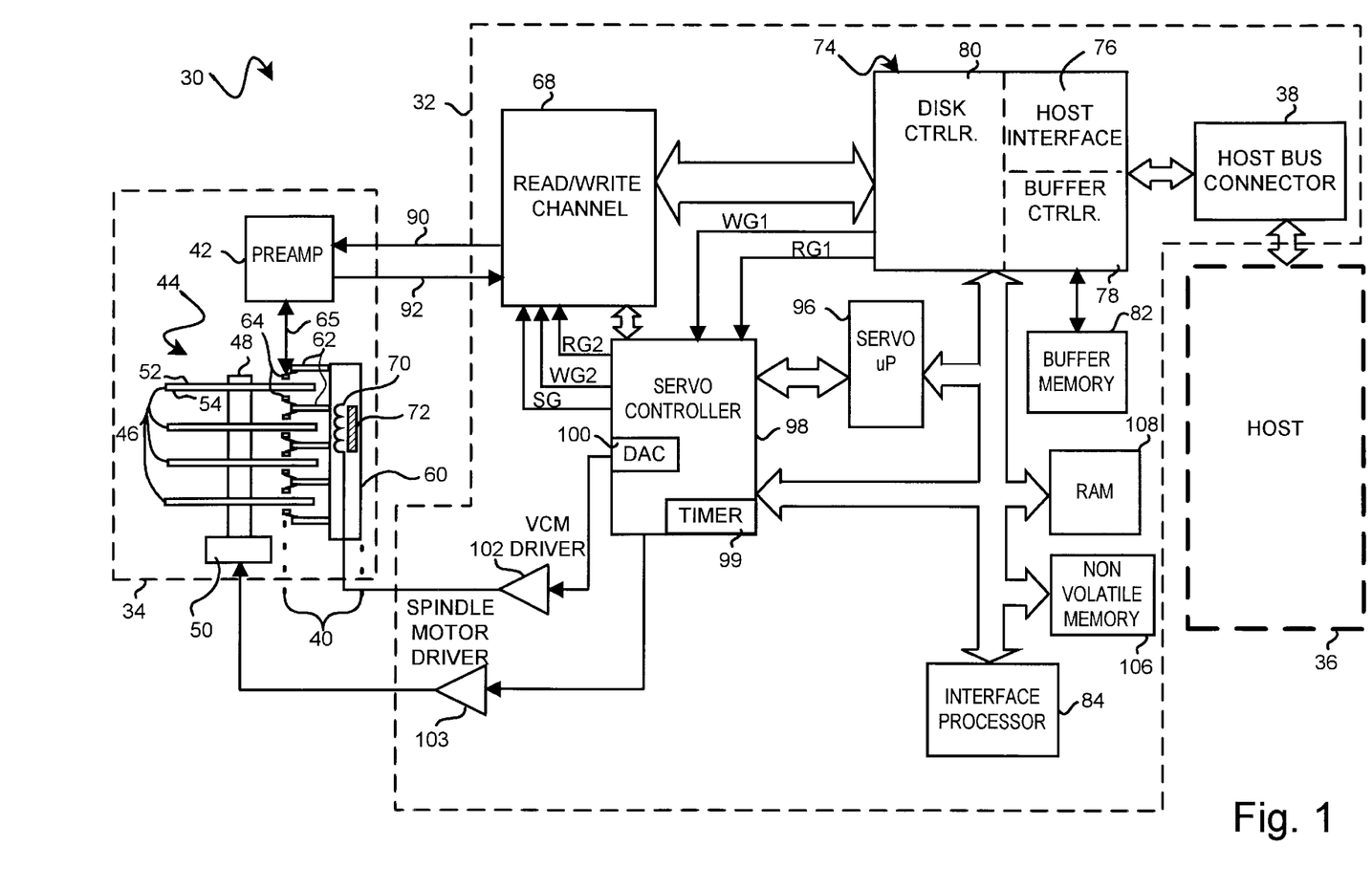
FIG. 1 is a block diagram of a hard disk drive embodying the invention.

A hard disk drive according to the present invention is illustrated generally at 30 in FIG. 1. Disk drive 30 employs a data region recovery system, including a system and method for writing a block of data (or multiple blocks of data) to a data region following detection of a defective servo sector. Disk drive 30 includes a disk control system 32 and a head disk assembly (HDA) 34. Disk control system 32 includes circuitry and processors which provide an intelligent disk control system interface between a host system 36 and HDA 34 for execution of read and write commands.

Host system 36 can include a microprocessor based data processing system such as a personal computer, or other system capable of performing a sequence of logical operations. Data is transmitted between host system 36 and disk control system 32 via a host bus connector 38.

HDA 34 includes an actuator assembly 40, a preamplifier 42, and a disk assembly 44. Disk assembly 44 includes a plurality of magnetic media disks, such as indicated at 46. Disks 46 are stacked on a spindle assembly 48. Spindle assembly 48 is mechanically coupled to a spindle motor 50 for rotating disks 46 at a high rate of speed. Each disk 46 includes two disk recording surfaces (i.e., disk surfaces) capable of storing data thereon, such as indicated at 52 and 54. The disk surfaces are described in detail further in the specification.

Actuator assembly 40 includes a voice coil motor (VCM) 60 and multiple actuator arms 62 extending from VCM 60. Each actuator arm 62 corresponds to a respective disk surface, such as disk surface 52 and 54. A transducer head 64 is disposed at the end of each actuator arm 62 and each transducer head 64 is associated with a corresponding disk surface 52, 54. Transducer heads 64 communicate with disk control system 32 via preamplifier 42 for reading and writing data to the associated disk surface 52, 54. Preamplifier 42 is electrically coupled to transducer head 64 by connecting means, indicated at 65, for receiving and recording signals which are representative of magnetic transitions on a selected disk surface 52, 54. Preamplifier 42 provides an amplified signal to a read/write channel 68 of disk control system 32. The read/write channel 68 performs a coding and decoding of data written to and read from the disks 46. The read/write channel 68 is described in detail further in the specification.

VCM 60 includes a coil 70 moving in proximity to a permanent magnet 72. Actuator arms 62 are permanently coupled to VCM 60. VCM 60 controllably swings actuator arm 62 and their corresponding transducer heads 64 back and forth over their associated disk surface 52, 54 to access target data tracks formed on the associated disk surface.

Disk control system 32 includes an integrated circuit host interface and disk controller (HIDC) 74 having a host interface 76, a buffer controller 78 and a disk controller 80. Host interface 76 communicates with host system 36 via host bus connector 38 by receiving commands and data from and transmitting status and data back to host system 36. Buffer controller 78 controls a buffer memory 82 employed for storing data from host system 3 6 which is to be written to a disk surface (e.g., disk surface 52). In addition, buffer controller 78 controls buffer memory 82 for storing data read from disk surface 52. Host interface 76 provides for the data to be transmitted to and from the host system. Buffer memory 82 typically comprises random access memory (RAM), such as dynamic random access memory (DRAM). Disk controller 80 sends data to and receives data from read/write channel 68. Disk controller 80 also provides for error correction and error detection on data read from a disk surface.

An interface processor 84 handles the flow of data commands received by host interface 76 by sending commands to and reading status from disk controller 80. Interface processor 84 ascertains which commands to process from host system 36 and when to process these commands, and directs other tasks performed by disk controller 80.

Read/write channel 68 is coupled to preamplifier 42, indicated by read lines 90 and write lines 92. During a read operation, preamplifier 42 amplifies the transition pulses that are detected by a transducer head 64 associated with a disk surface and amplifies them to a signal level that can be processed by read/write channel 68. Read/write channel 68 receives the magnetic transition pulses read from the disk surface and further amplifies, filters and converts the transition pulses into digital data which is output to disk controller 80. During a write operation, the read/write channel 68 receives data from disk controller 80 and converts the data into pulses for writing data to a disk surface via write lines 92 and preamplifier 42. Preamplifier 42 generates current to drive the transducer head to write transitions on the disk surface.

A servo processor 96 commands a servo controller 98 to control the position of transducer head 64 over disk 46 at a target data track for subsequent execution of read or write commands. Servo processor 96 receives a representative form of a position signal sensed by transducer head 64, via preamplifier 42 and read/write channel 68 and performs calculations to position transducer head 64 relative to its associated disk surface. A digital signal-to-analog converter (DAC) 100 in servo controller 98 responds to digital commands from servo processor 96 to provide a corresponding analog signal to VCM driver 102. VCM driver 102 responds to the analog signal from DAC 100 to provide a corresponding current to VCM 60. The current from VCM driver 102 is provided to coil 70 of VCM 60 and causes movement of actuator assembly 40 which in turn causes the attached actuator arms 62 to swing and thereby move transducer head 64 over an associated disk surface 52, 54 to access target data tracks. Servo processor 96 also provides commands to servo controller 98 to control the rotational velocity of spindle motor 50. Servo processor 98 controls the rotational velocity of spindle motor 50 via servo controller 98 and a spindle motor driver 103 to maintain a substantially constant operational rotational velocity of rotating disks 46.

Disk control system 32 further includes read gate RG1 and write gate WG1 electrically coupled between disk controller 80 and servo controller 98. Read gate RG2 and write gate WG2 are electrically coupled between servo controller 98 and read/write channel 68. Read gates RG1 and RG2 must be asserted for reading of data from a disk surface through read/write channel 68. Similarly, write gates WG1 and WG2 must be asserted before writing of data occurs on a disk surface through read/write channel 68. Servo gate signal SG is enabled when reading servo data from a servo sector located on a disk surface. Also, read gate RG1 or write gate WG1 may be asserted, but servo controller 98 may prohibit the reading or writing of data. For example, when writing data to a disk surface, interface processor 84 may command disk controller 80 to write multiple blocks of data to a data region or series of data sectors on a disk surface, but servo controller 98 may receive an off-track signal from servo processor 96 to prohibit writing by not enabling write gate WG2 if the transducer head is not on track with the desired target track.

Disk drive control system (including servo system) operational programs are stored in non-volatile memory 106, which may be read-only memory (ROM) or flash memory, and are loaded into RAM 108 for execution. Alternatively, system operational programs may be stored on reserve cylinders on disk 46. Upon startup of hard disk drive 30, disk drive programs, such as the servo system operational programs, are transferred into RAM 108 for fast access by servo processor 96 for positioning transducer head 64 for execution of read and write commands.

In an exemplary operation of disk drive 30, servo processor 96 receives a command to position actuator assembly 40 for accessing data or writing data on a specific target data track on a disk surface 52 or 54. In operation of disk drive 30, disk controller 80 keeps track of where transducer head 64 is circumferentially located over disk 46, and servo processor 96 keeps track of which circular data track or "cylinder" of data tracks the transducer head is over, and maintains timing and keeps the transducer head tracking or following on the desired target data track.

The current circular data track position of transducer head 64 is stored in RAM 108 to permit servo processor 96 to determine a required seek distance between the current data track and a target data track on disk 46. Based on the required seek distance, servo processor 96 retrieves a corresponding read or write seek profile from RAM 108 and provides a digital signal command to DAC 100 corresponding to the seek profile. DAC 100 provides a corresponding analog signal to VCM driver 102 representative of the seek profiles. VCM driver 102 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of the servo sectors or "wedges" disposed on disk surface 52 or 54. Based on this position information, a position signal is provided via preamplifier 42, read/write channel 68, and servo controller 98 to servo processor 96 to provide a representative position of transducer head 64 relative to its associated disk surface 52 or 54. Upon completion of a seek operation and the corresponding alignment of transducer head 64 over the target data track, a read or write command is executed to read data from or write to the target data track.

The disk drive 30 can include a disk surface having a defective servo sector. The disk control system 32 and head disk assembly 34 cooperate to employ a data region recovery system which allows writing of a block of data (or multiple blocks of data) to a data region following detection of the defective servo sector. If it is determined that the data region is unrecoverable (i.e. unusable), the present invention also provides for reallocation of the data region using a defect management scheme.

Figure 2:
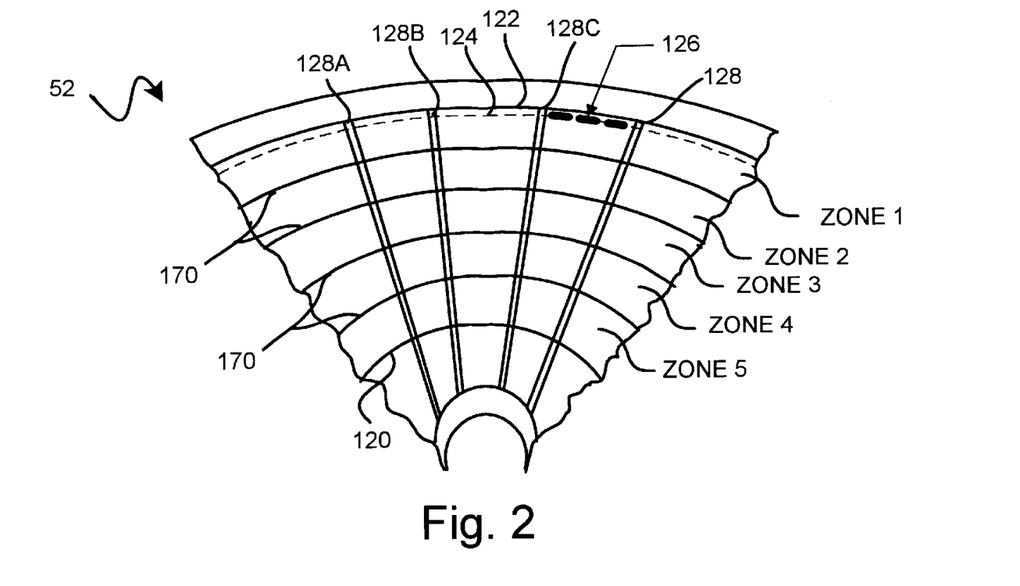
FIG. 2 is a partial plan view of a disk surface having a defective servo sector.

FIG. 2 is a partial plan view illustrating a disk surface having a defective servo sector, indicated as disk surface 52. Disk surface 52 includes an inner boundary 120 and an outer boundary 122. Data is stored on concentric, circular tracks, indicated by representative line 124, between inner boundary 120 and outer boundary 122. Recorded information (i.e., user data) on the disk surface is divided into data regions or groups of data sectors 126. Embedded information is recorded in servo sectors or servo "wedges" placed in radially continuous narrow regions (terms "servo sectors") between groups of data sectors 126, indicated at 128. Servo information is contained in the servo sectors 128 in a number of fields. Such fields may include a field for automatic gain control/phase lock oscillator initialization, a timing information/bit synchronization field (e.g., a servo sync word), a track identification field having the address of the track and servo burst fields for positioning a transducer head over a data track.

Using zone recording techniques, groups of adjacent data tracks are assigned to a plurality of zones between the inner boundary 120 and the outer boundary 122. Disk surface 52 has been partitioned into five physical zones, illustrated by partitions 170, labeled ZONE 1, ZONE 2, ZONE 3, ZONE 4 and ZONE 5. Disk surface 52 may be partitioned into any desirable useable number of zones, which more typically, ranges between 10 and 16 zones. The establishment of zones allows for efficiency in recording by varying recording frequencies to maintain approximately constant linear bit density across the disk as is well known in the art.

Further, each zone may be divided into one or more designated partitions where each partition includes a number of spare data sectors or data tracks. If a disk defect is detected, a defect management scheme can be employed for marking the defective data sector, reallocating the remaining data sectors within the partition and using one of the spare sectors.

Figure 3:
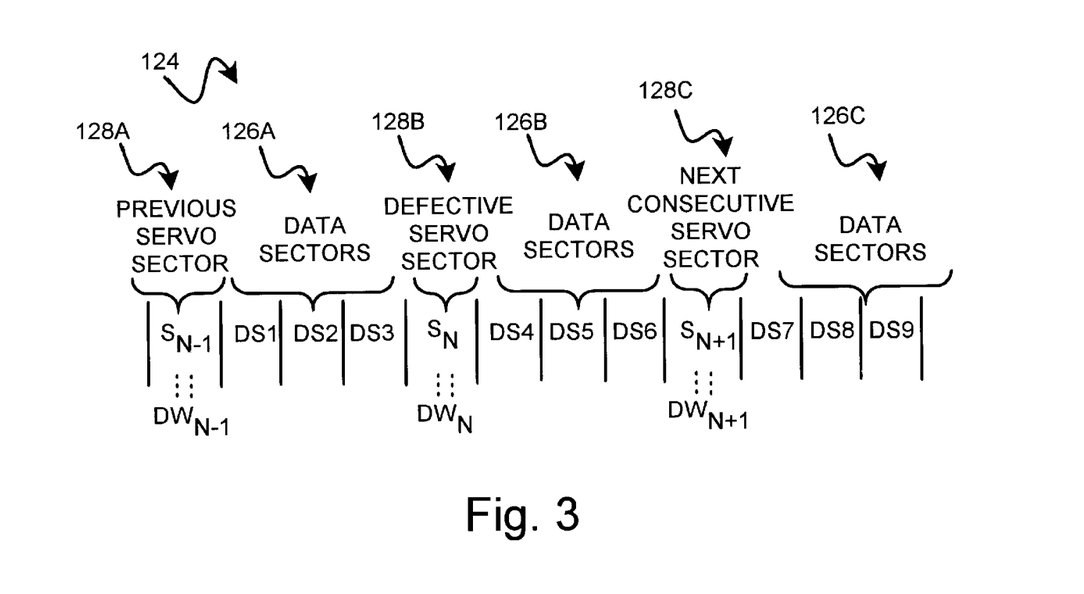
FIG. 3 is a partial linear view of a data track having a defective servo sector.

Disk surface 52 may include a data track 124 having a defective servo sector. In FIG. 3, a portion of a data track 124 having a defective servo sector is illustrated. In particular, data track 124 includes defective servo sector $S_n$ 128B, previous servo sector $S_{n-1}$ 128A, and next consecutive servo sector $S_{n+1}$ 128C. Located between previous servo sector $S_{n-1}$ and defective servo sector $S_n$ is a data region 126A having data sectors DS1, DS2 and DS3; located between defective servo sectors $S_n$ and next consecutive servo sector $S_{n+1}$ is a data region 126B having data sectors DS4, DS5 and DS6; and following next consecutive servo sector 128C is a data region 126C having data sectors DS7, DS8 and DS9. Suitably, data regions 126A, 126B and 126C each include three data sectors. Alternatively, data regions 126A, 126B, 126C may include any useable number of whole data sectors and partial data sectors to which blocks of data may be read or written. Typically, each data sector is capable of storing a data block comprising 512 bytes of user information as well as appended redundancy bytes used for error detection and correction. Multiple blocks of consecutive data are typically written consecutively to a data region or a plurality of data sectors. Detection windows $Dw_{n-1}$, $Dw_n$ and $Dw_{n+1}$ are also shown, and are discussed later in the specification.

Figure 4:
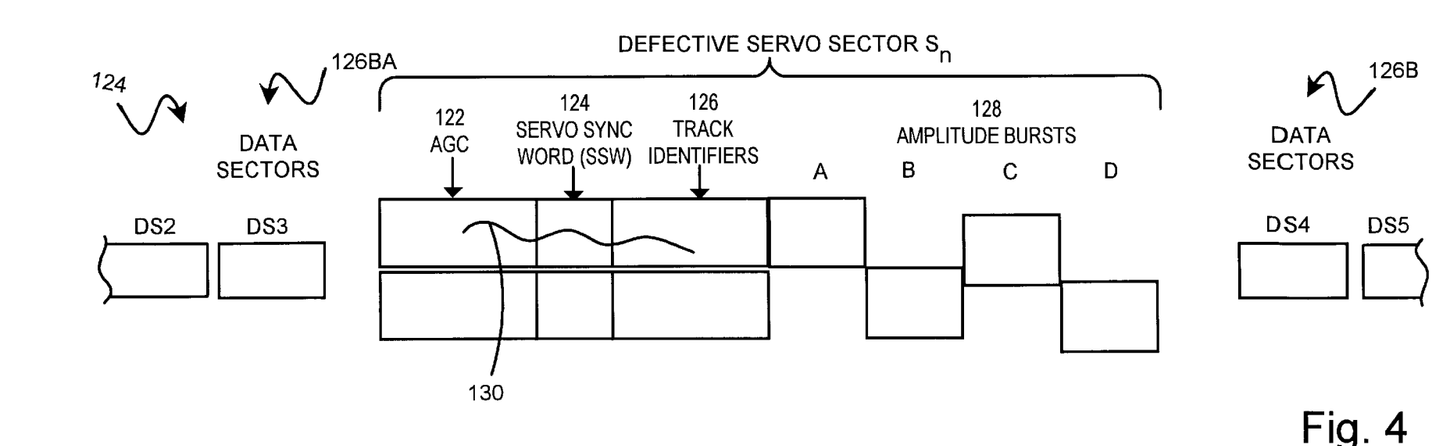
FIG. 4 is a diagram illustrating the field components of the defective servo sector of FIG. 3.

In FIG. 4, a portion of data track 124 is shown, illustrating defective servo sector $S_n$. Defective servo sector $S_n$ includes multiple fields which provide timing and tracking information used by the servo system. Suitably, fields contained within defective servo sector $S_n$ include gain control/phase oscillator (AGC/PLO) field 122, servo sync word (SSW) field 124, track address 127 and amplitude bursts A, B, C, D 128. AGC/PLO field 122 allows for setting the gain of the AGC amplifier in channel 68 and for synchronizing a clock to the incoming data. SSW 124 serves as a sector timing mark to verify receipt of a servo sector, establish bit synchronization, and to establish the timing between sequential servo sectors. Track identification 127 identifies the data track address or number to the servo controller. Amplitude bursts 128 provide information to allow for fine positioning of the transducer head over data track 124.

Defective servo sector $S_n$ includes a sector defect 130 which obscures servo sync word 124 preventing its detection. Sector defect 130 is a hard defect, and is not transient in nature. For example, sector defect 130 may be a microscratch in the disk surface caused by mishandling of the disk drive. Disk drive 30 employs a data region recovery method which allows for writing a block of data (or multiple blocks of data) to a data region (e.g., data sector DS4) following defective servo sector $S_n$.

In FIGS. 5–9, flow charts and timing diagrams illustrate disk drive 30 and method which employs a data region recovery procedure by writing a block of data to a data sector following detection of defective servo sector $S_n$. The disk drive system and method employing the data region recovery system increases operating capacity in the disk drive system by more efficiently handling the impact of defective servo sectors. Each of these figures are described in detail in the following paragraphs, while also referring to previously discussed FIGS. 1–4.

Two-tier data region recovery procedure

Figure 5:
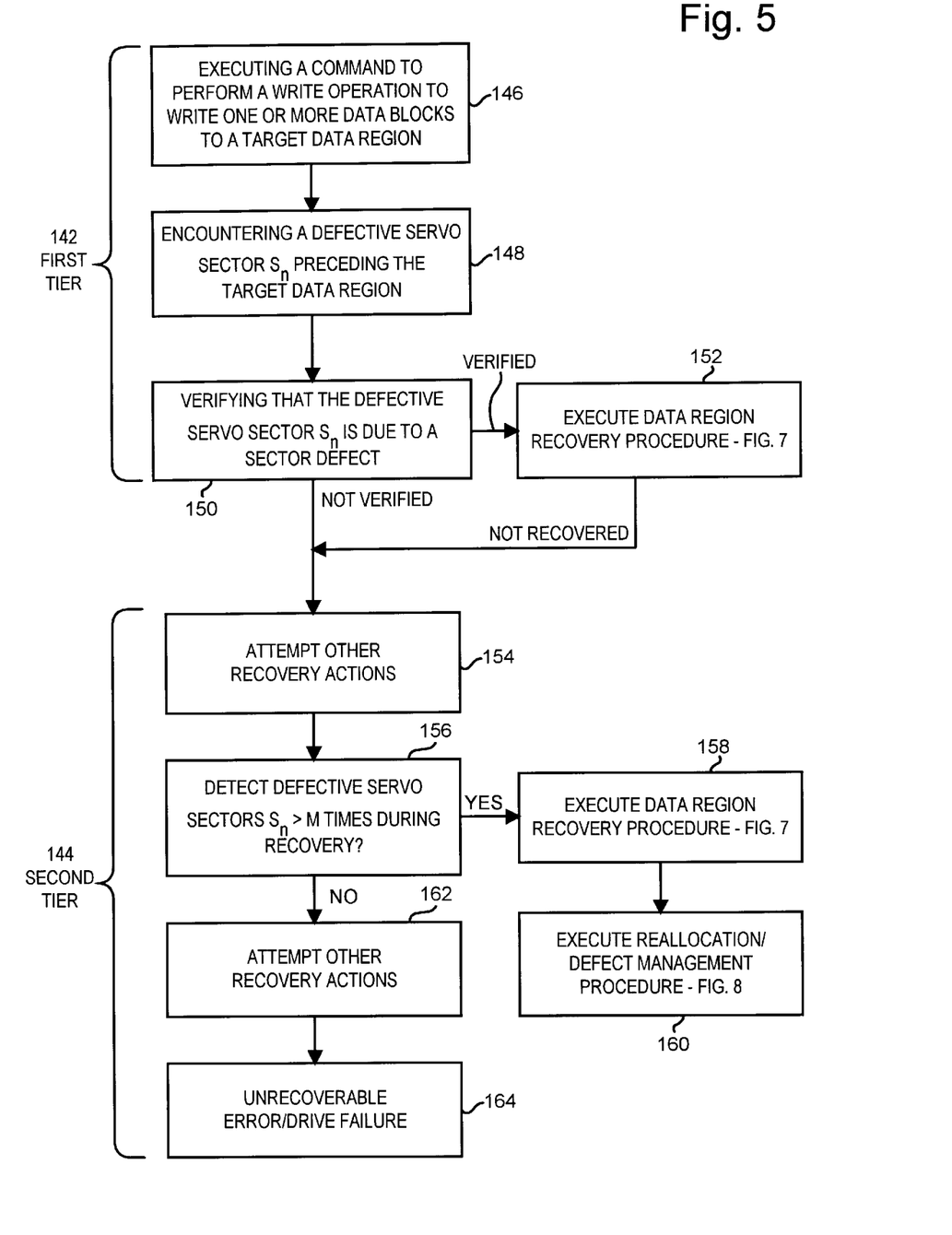
FIG. 5 is a flowchart illustrating a two tiered method of recovering a data region following detection of a defective servo sector in accordance with a preferred embodiment of the invention.

FIG. 5 is a flow chart illustrating a two-tiered approach for determining whether a data region following a defective servo sector is recoverable, or whether a reallocation/defect management procedure must be employed. In particular, first tier 142 determines whether the command may be executed to write a block of data to a target data region following detection of defective servo sector $S_n$, and second tier 144 determines whether the data region may be recovered using other recovery actions, or reallocated using a defect management procedure.

In step 146, a command from the host is executed to perform a write operation to write one or more data blocks to a target data region. For example, the target data region may be data sector DS4 shown in FIG. 3. In step 148, a defective servo sector $S_n$ is encountered preceding the target data sector DS4. In step 150, it is verified that the defective servo sector $S_n$ which precedes target data sector DS4 is due to a sector defect. The verification of step 150 is typically a series of retries and other actions which may include moving the head away from the track and back to establish that a hard sector defect exists in the servo sector. Once it is verified that the servo sector $S_n$ is defective due to a sector defect, the data region recovery procedure is executed, indicated at 152. A data sector recovery procedure is illustrated in the flow chart of FIG. 7 and is described in detail later in the specification.

If it is not verified that the servo sector $S_n$ is defective due to a sector defect, or the data region was not recoverable using the data region recovery procedure, the reallocation scheme of second tier 144 is executed. The reallocation scheme of second tier 144 provides for reallocation of a data region previously determined unrecoverable if certain criteria are met, while also providing for other recovery actions to be employed. Such recovery actions may clear the defect associated with the servo sector $S_n$ if it is transient in nature.

In step 154, other recovery actions are attempted in order to recover the target data region. Such recovery actions may include executing a retry operation which continuously retries executing the command to perform the write operation to write a data block to the target data sector DS4. In step 156, if the defective servo sector $S_n$ is detected greater than M (a desired or predetermined number) of times during the recovery actions, the data region recovery procedure is executed, indicated in step 158. After execution of the data region recovery procedure, a reallocation/defect management procedure is executed as indicated in step 160. A reallocation/defect management procedure is illustrated in the flow chart of FIG. 8, which will be described in detail later in this specification. The reallocation/defect management procedure marks the physical target data region unusable, and relocates the target data region to a spare region elsewhere on the disk surface.

In step 162, if the defective servo sector $S_n$ is not detected greater than M (a desired or predetermined number) of times during the recovery actions (indicated in step 156), other recovery actions are continuously attempted. Such other recovery actions may include executing a retry operation which continuously retries executing the command to perform the write operation to write a data block to the target data sector DS4. If the defective servo sector and surrounding target data region is not recoverable through these recovery actions, an unrecoverable error/drive failure error is posted, indicated in step 164.

Figure 6:
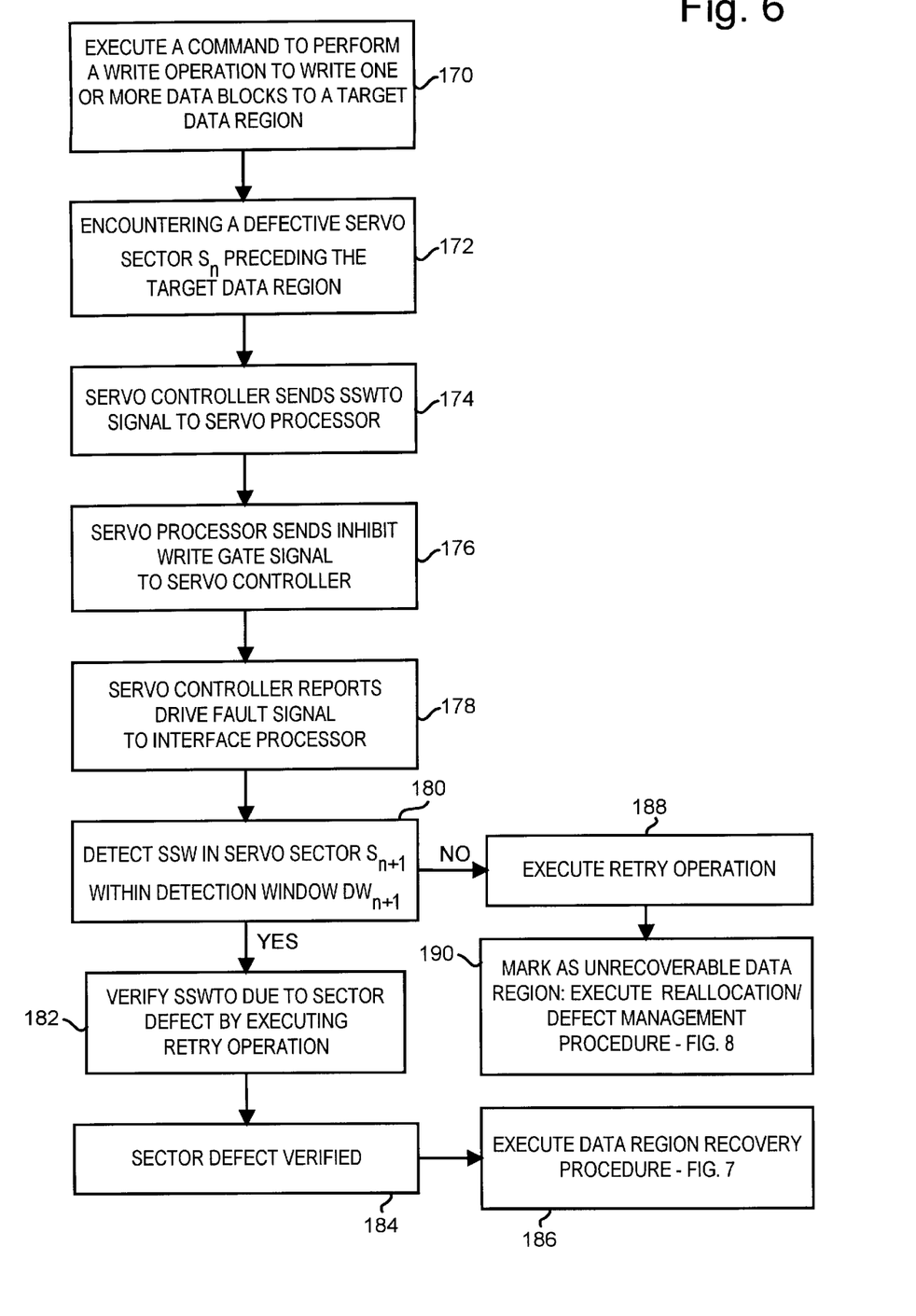
FIG. 6 is a more detailed flowchart illustrating the first tier of the method illustrated in FIG. 5.
Figure 7:
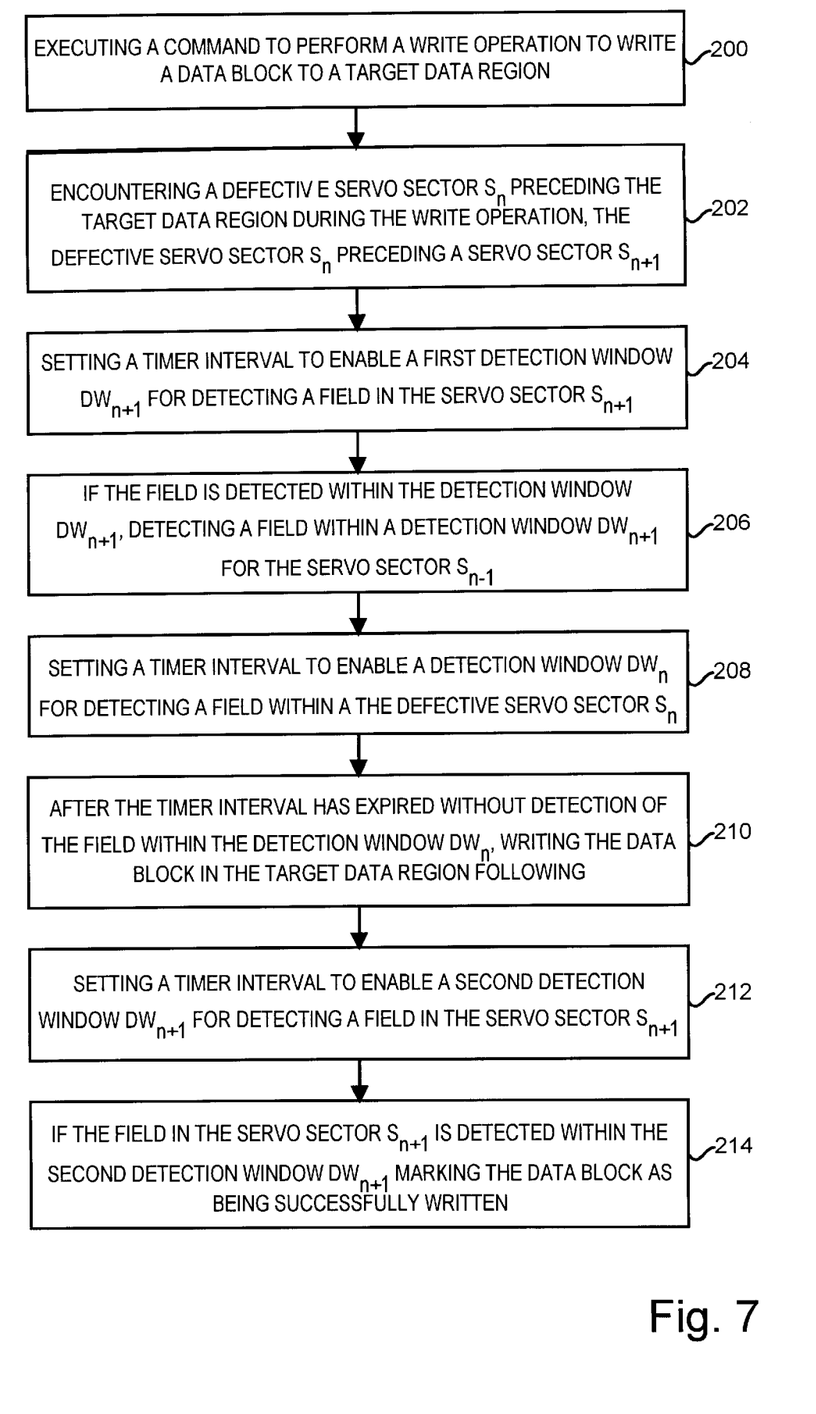
FIG. 7 is a detailed flowchart illustrating a data sector recovery procedure for writing a block of data to a data region following detection of a defective servo sector.
Figure 8:
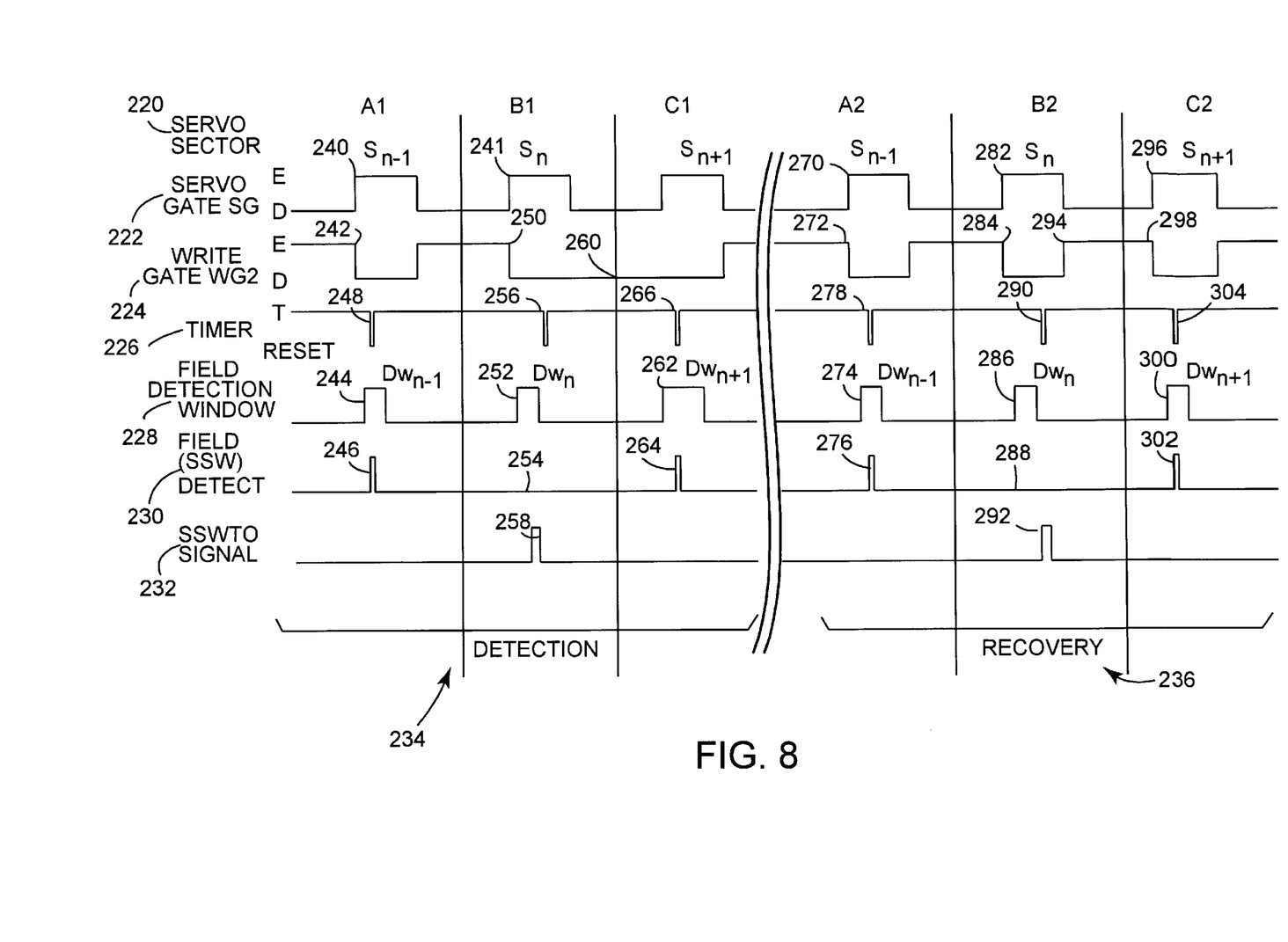
FIG. 8 is a timing diagram illustrating selected timing signals for the method of writing a block of data to a data region following detection of a defective servo sector.

In FIG. 6 and FIG. 7, flow charts illustrating first tier 142 are illustrated in more detail. In particular, FIG. 6 illustrates one method of determining whether the target data region following defective servo sector is recoverable, and FIG. 7 illustrates a data region recovery procedure. The timing diagrams of FIG. 8 are then described to illustrate the relative timing of signals during the recovery process. In this exemplary embodiment, reference is made to FIGS. 1–4, wherein the target data region is data sector DS4 following defective servo sector $S_n$ 128B, and the defective servo sector $S_n$ 128B causes disk control system 32 to fail to detect a field (e.g. servo sync field 124) within the servo sector.

First tier 142 (determining whether target data region following defective servo sector is recoverable)

Referring to FIG. 6, in step 170 a command to perform a write operation to write one or more data blocks to a target data region (e.g., target data sector DS4) is executed. Defective servo sector $S_n$ 128B is encountered preceding the target data region DS4, indicated in step 172. As transducer head 64 follows data track 128, the servo sync word within servo sector $S_{n-1}$ is detected by the servo controller 98, but is not detected within defective servo sector $S_n$ due to the presence of sector defect 130. In particular, a servo sync word is detected within the detection window for the servo sector $S_{n-1}$. Servo controller 98 sets a timer interval within timer 99 to enable detection window $Dw_n$ for detecting a servo sync word within the defective servo sector $S_n$. A servo sync word timeout signal (SSWTO) is generated after the timing interval has expired without detection of the servo sync word within the detection window $Dw_n$. Suitably, the SSWTO signal can be designated by a bit set in a register in servo controller 98.

Since the servo controller 98 failed to detect the servo sync word 124 within a detection window $Dw_n$, in step 174 the servo controller 98 sends the SSWTO signal to servo processor 96. In response to the SSWTO signal, the servo processor 96 sends an inhibit write gate signal to servo controller 98. In step 178, the servo controller 98 reports a drive fault signal to interface processor 84.

In step 180, a servo sync word 124 for the next consecutive servo sector $S_{n+1}$ is detected within detection window $Dw_{n+1}$. If the detection is successful, step 182 is executed to verify that the servo sync word timeout in sector $S_n$ was due to a sector defect by executing a retry operation. In particular, if the servo sync word timeout was due to a transient error, the retry operation allows time to pass for the error (defect) associated with defective servo sector to clear. Suitably, it is verified that the servo sync word timeout is due to a sector defect by retrying execution of the write operation to write one or more data blocks to a target data region a predetermined number of times to attempt to clear the transient error. Once the retry operation has been executed without clearing the error associated with the defective servo sector $S_n$, it is determined that a "hard error" has occurred and the sector defect is verified, indicated in step 184. Next, in step 186 the data region recovery procedure is executed as discussed with regard to FIG. 7 below.

In step 188, if the servo sync word for the next consecutive servo sector $S_{n+1}$ is not detected within the detection window $Dw_{n+1}$, a retry operation is executed. The disk drive 30 must detect the servo sync word in the next consecutive servo sector $S_{n+1}$ within detection window $Dw_{n+1}$ in order to verify sector timing by servo controller 98. If the disk drive 30 fails to detect the servo sync word in the next consecutive servo sector $S_{n+1}$ within detection window $Dw_{n+1}$ after the retry operation 188 has been executed, in step 190 the data region is marked as an unrecoverable data sector and a reallocation/defect management procedure is executed.

First tier 142 (data region recovery procedure)

FIG. 7 is a flow chart illustrating a data region recovery procedure which allows a data block to be written to a target data region following a detection of defective servo sector. In step 200, a command is executed to perform a write operation to write a data block to a target data region, such as target data region DS4. In step 202, defective servo sector $S_n$ is encountered preceding the target data region DS4 during the write operation, wherein the defective servo sector $S_n$ directly precedes the servo sector $S_{n+1}$ and directly follows the servo sector $S_n$. This step may include detecting a servo sync word within a detection window $Dw_{n-1}$ for servo sector $S_{n-1}$. A timer interval is set by the servo controller timer 99 to enable a detection window $Dw_n$ for detecting a servo sync word within the defective servo sector $S_n$. A servo sync word timeout signal is generated after the timing interval has expired without detection of the servo sync word within the detection window $Dw_n$.

In step 204, a timer interval is set by servo controller timer 99 to enable a first detection window $Dw_{n+1}$ for detecting a servo sync word field in the servo sector $S_{n+1}$. In step 206, according to the data region recovery procedure, if the servo sync word field is detected within the detection window $Dw_{n+1}$, a servo sync word field must then be detected within the detection window $Dw_{n-1}$ for the servo sector $S_{n-1}$.

In step 208, a timer interval is set by servo controller timer 99 to enable a detection window $Dw_n$ for detecting a servo sync word field within the defective servo sector $S_n$. In step 210, after the timer interval has expired without detection of the servo sync word field within detection window $Dw_n$, thereby generating the SSWTO signal, the data block is written in the target data sector DS4 following the defective servo sector $S_n$. In particular, the generation of the timeout signal SSWTO after having previously detected a servo sync word in servo sector $S_{n-1}$ validates the subsequently detected start of the target data sector through conventional data sector timing means. In step 212, a timer interval is set to enable a second detection window $Dw_{n+1}$ for detecting a servo sync word field in the servo sector $S_{n+1}$. If the field in the servo sector $S_{n+1}$, is detected within the second detection window $Dw_{n+1}$, the data block is marked as being successfully written, indicated in step 214.

First tier 142 (timing of process signals)

In FIG. 8, a timing diagram is shown illustrating the timing of process signals for the first tier 142 process. At 220, the servo sectors $S_{n-1}$, $S_n$, and $S_{n+1}$ relatively are positioned in time. The timing diagram for servo gate SG is indicated at 222; the timing diagram for write gate WG2 is indicated at 224; the timing diagram for the timing interval set within servo controller timer 99 is indicated at 226; the timing diagram for the field detection window is indicated at 228; the timing diagram for a signal representative of detection of the servo sync word field is indicated at 230; and a timing diagram representative of the servo sync word timeout signal is illustrated at 232.

The detection portion of the timing diagrams, indicated at 234, illustrates the period during which the defective servo sector is detected, and is divided into timing sections A1, B1 and C1. The recovery portion of the timing diagrams, indicated at 236, illustrate the period during execution of the data region recovery procedure, and is further divided into timing sections A2, B2 and C2.

In reference to timing section A1, servo gate SG is asserted as the transducer head 64 passes over each of servo sectors $S_{n-1}$, $S_n$, and $S_{n+1}$. When servo gate SG is asserted, the fields within servo sector $S_{n-1}$, $S_n$, and $S_{n+1}$ may be detected by servo controller 98. After the transducer passes over each servo sector, the servo gate SG is de-asserted. In reference to timing diagram 224, when servo gate SG is asserted, write gate WG2 is de-asserted, assuring that writing will never take place across a servo sector. In reference to timing section A1, as the transducer head 64 passes over servo sector $S_{n-1}$, a timer interval has been set to enable detection window $Dw_{n-1}$ for detecting a servo sync word within servo sector $S_{n-1}$, indicated at 244. Once the servo sync word within servo sector $S_{n-1}$ is detected, indicated by signal 246, the servo controller timer 99 is reset, indicated at 248, to establish an interval for detection of the fields within the next servo sector $S_n$.

In reference to timing section B1, as the transducer head 64 passes over servo sector $S_n$, servo gate SG is asserted (indicated at 241), and write gate WG2 is de-asserted (indicated at 250). Detection window $Dw_n$ is enabled for detection of the servo sync word 124 within servo sector $S_n$, indicated at 252. Due to sector defect 130, the servo sync word 124 is not detected, indicated at 254, within field detection window $Dw_n$. After the timer interval for field detection window $Dw_n$ has expired without detection of the servo sync word within the detection window $Dw_n$, the servo controller timer 99 is reset, indicated at 256. The servo controller 98 sends a servo sync word timeout signal, indicated at 258, to servo processor 96. Servo processor 96 sends an inhibit write gate signal to servo controller 98. The servo processor 96 posts a servo sync word timeout write inhibit to the interface processor 84, resulting in write gate WG2 not being asserted, indicated at 260.

In reference to timing portion C1, a timer interval is set to enable a detection window $Dw_{n+1}$ for detecting a servo sync word field 124 in the servo sector $S_{n+1}$ based on the servo sync word timeout signal 258. The first detection window $Dw_{n+1}$ is indicated at 262. Because the servo sync word was not detected within detection window $Dw_n$ for servo sector $S_n$ (to verify timing), the detection window $Dw_{n+1}$ for servo sector $S_{n+1}$ is widened or made of a longer duration than the previous detection window $Dw_n$ to aid in detecting the servo sync word field within servo sector $S_{n+1}$. The servo sync word 124 in sector $S_{n+1}$ is detected, indicated at 264, and the servo controller timer 99 is reset, indicated at 266.

Timing portions A2, B2, and C2 illustrate the timing diagrams during execution of the data region recovery procedure. After execution of a command to perform a write operation to write a data block to the target data sector DS4, servo gate SG is asserted, indicated at 270, and write gate WG2 is de-asserted, indicated at 272, for detecting the fields in servo sector $S_{n-1}$. A timer interval for detection window $Dw_{n-1}$ is enabled, indicated at 274. The servo sync word field 124 is detected within the detection window $Dw_{n-1}$, indicated at 276, and the servo controller timer 99 is reset, indicated at 278.

During timing portion B2, servo gate SG is asserted and write gate WG2 is de-asserted indicated at 282 and 284 for reading fields within the servo sector $S_n$. A timer interval is set to enable detection window $Dw_n$, indicated at 286. Again, due to the sector defect 130, the servo sync word field is not detected within the detection window $Dw_n$, indicated at 288. After the timing interval has expired without detection of the servo sync word field within the detection window $Dw_n$, the servo controller timer 99 is reset, indicated at 290. The servo controller 98 sends a servo sync word timeout signal to the servo processor 96, indicated at 292. The servo processor 96 ignores the servo sync word timeout signal and does not inhibit write gate signal WG2 from servo controller 98 to read/write channel 68, indicated at 294. Servo controller 98 allows the data block to be written to target data region DS4 following defective servo sector $S_n$.

In reference to timing portion C2, servo gate SG is asserted and write gate WG2 is de-asserted for reading the fields within servo sector $S_{n+1}$, indicated at 296 and 298 respectively. A timer interval is set to enable a second detection window $Dw_{n+1}$ for detecting a servo sync word field in the servo sector $S_{n+1}$, indicated at 300. Preferably, during the data region recovery procedure after detection of defective servo sector $S_n$, the duration of detection window $Dw_{n+1}$ is not widened or made longer in duration as it was during detection portion 234, and more preferably is of the same duration or a smaller duration as detection window $Dw_n$ for servo sector $S_n$. By keeping detection window $Dw_{n+1}$ narrow, the timing for writing the data block to target data sector DS4 is verified. If the servo sync word field in servo sector $S_{n+1}$ is detected, within the second detection window $Dw_{n+1}$, indicated at 302, the servo controller timer 99 is reset, indicated at 304, and the data block is marked as being successfully written.

Second tier 144 (data sector reallocation/defective management procedure)

Figure 9:
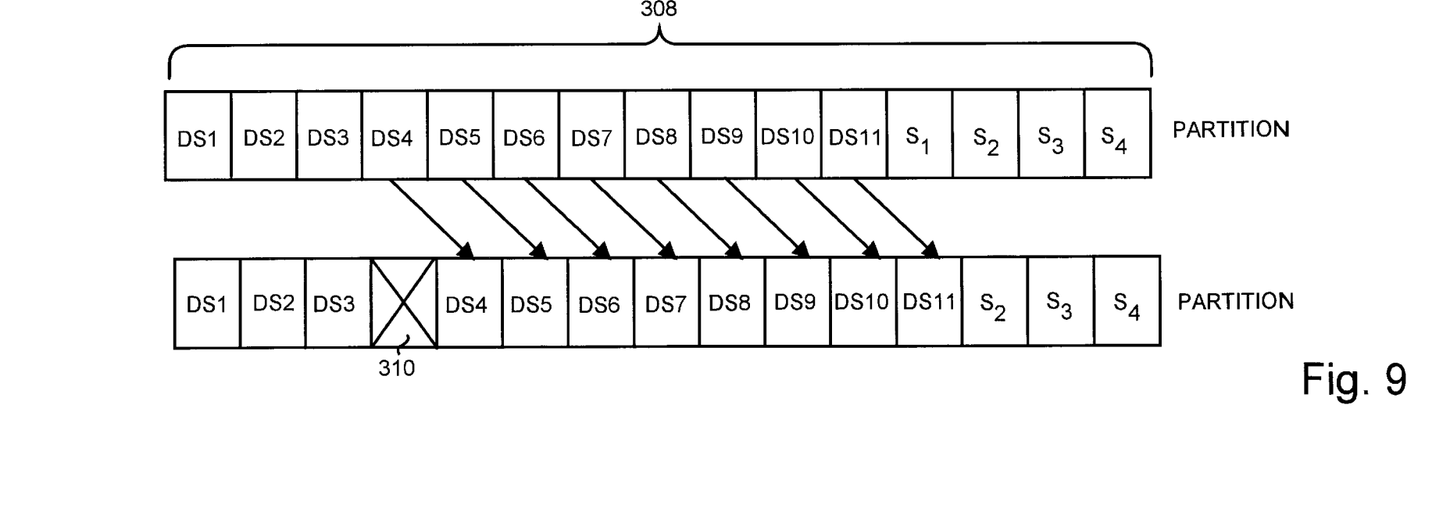
FIG. 9 is a diagram illustrating a data sector reallocation/defect management procedure.

In FIG. 9, a diagram illustrating a data sector reallocation/defective management procedure is illustrated. The reallocation procedure is a "push down" scheme as known to one skilled in the art. In particular, data sectors DS1, DS2, DS3, DS4, DS5, DS6, DS7, DS8, DS9, DS10, and DS11 are shown for PARTITION 1 on disk surface 52, are represented at 308. Further, spare data sectors S1, S2, S3 and S4 have been allocated for PARTITION 1, and are available for use. The spare data sectors are located at the end of PARTITION 1. Alternatively, spare data sectors can be allocated using other schemes, such as partitioning groups of data tracks together for defect management, wherein spare data sectors are located at the end of each partition.

If after completion of the data region recovery procedure, the target data sector DS4 is determined to be an unrecoverable data sector as previously described herein, the target data sector DS4 is marked as an unrecoverable data sector (and therefore unusable), indicated by an X at 310. The data sector DS4 may be listed in a defect list in a table in memory. The remaining data sectors DS4, DS5, DS6, DS7, DS8, DS9, DS10 and DS11 are each "pushed-down" one data sector location within PARTITION 1. This results in data sector DS11 using the data sector location previously identified as spare $S_1$. After review of this disclosure, other defective management schemes will become apparent to those skilled in the art for reallocation of the target data sector if it is marked as unrecoverable or unusable.

Because a servo sector may be defective due to a transient error that may clear over time, the data region recovery procedure is preferably applied to each data sector following a defective servo sector. In this manner, if a transient error is subsequently cleared from the defective servo sector, the remaining data sectors can be reliably written without requiring reallocation that will consume spare sectors. Alternatively, data sectors following a defective servo wedge are reallocated during the same data region recovery procedure.

We claim:

1. A method of operating a disk drive having a sampled signal head positioning servo system and a rotating disk with a plurality of data tracks on a surface of the disk, wherein each data track has multiple spaced-apart sequentially-active servo sectors and data regions disposed between the servo sectors, the method comprising the steps of:

executing a command to perform a write operation to write a data block to a target data region;

encountering a defective servo sector $S_n$ preceding the target data region during the write operation, the defective servo sector $S_n$ preceding a servo sector $S_{n+1}$ and following a servo sector $S_{n-1}$;

setting a timer interval to enable a first detection window $Dw_{n+1}$ for detecting a field in the servo sector $S_{n+1}$;

if the field is detected within the first detection window $Dw_{n+1}$, detecting a field within a detection window $Dw_{n-1}$ for the servo sector $S_{n-1}$;

setting a timer interval to enable a detection window $Dw_n$ for detecting a field within the defective servo sector $S_n$;

after the timing interval has expired without detection of the field within the detection window $Dw_n$, writing the data block in the target data region following the defective servo sector $S_n$ conditioned on detecting the field within the detection window $Dw_{n-1}$ for the servo sector $S_{n-1}$;

setting a timer interval to enable a second detection window $Dw_{n+1}$ for detecting a field in the servo sector $S_{n+1}$; and if the field in the servo sector $S_{n+1}$ is detected within the second detection window $Dw_{n+1}$, marking the data block as being successfully written.

2. The method of claim 1, wherein the step of writing the data block in the target data region further comprises the step of generating a field timeout signal.

3. The method of claim 2, wherein after generating a field timeout signal further comprising the steps of generating an inhibit writing signal, and ignoring the inhibit writing signal.

4. The method of claim 1, further comprising the step of verifying that the defective servo sector $S_n$ is due to a sector defect.

5. The method of claim 4, wherein the step of verifying that the defective servo sector $S_n$ is due to a defective sector includes the step of retrying execution of the command to perform a write operation to write the data block to the target data region.

6. The method of claim 1, wherein the step of encountering the defective servo sector $S_n$ comprises the steps of:

detecting a servo sync word within the detection window $Dw_{n-1}$ for servo sector $S_{n-1}$;

setting a timer interval to enable a detection window $Dw_n$ for detecting a field within the defective servo sector $S_n$; and generating a field timeout signal after the timing interval has expired without detection of the servo sync word within the detection window $Dw_n$.

7. The method of claim 6, further comprising the step of making the first detection window $Dw_{n+1}$ longer in duration than the detection window $Dw_n$.

8. The method of claim 1, further comprising the step of defining first detection window $Dw_{n+1}$ longer in duration than second detection window $Dw_{n+1}$.

9. The method of claim 8, further comprising the step of defining the second detection window $Dw_{n+1}$ to have the same duration as the detection window $Dw_n$.

10. The method of claim 1, wherein the detection window $Dw_{n-1}$ and the detection window $Dw_n$ have the same duration.

11. The method of claim 1, comprising the step of defining the field as a servo sync word field.

12. A disk drive comprising:

a disk control system including a sampled signal head positioning servo system;

a head disk assembly, the head disk assembly including a rotating disk with a recording surface;

the recording surface including a plurality of data tracks wherein each data track has multiple equally spaced-apart sequentially-active servo sectors and data regions disposed between the servo sectors, the recording surface including a target data region, a defective servo sector $S_n$ preceding the target data region, a servo sector $S_{n-1}$ preceding the defective servo sector Sn, and a servo sector $S_{n+1}$, following the defective servo sector $S_n$;

means for executing a command to perform a write operation to write a data block to the target data region; and means for detecting the servo sector $S_{n-1}$, the defective servo sector $S_n$ and the servo sector $S_{n+1}$ during the write operation, including timing means for enabling a timing window in which to detect a field for each servo sector, wherein after the detecting means detects the defective servo sector $S_n$, the timing means enables a first detection window $Dw_{n+1}$ for detecting a field in the servo sector $S_{n+1}$, and if the field is detected within the detection window $Dw_{n+1}$, the detecting mean detects a field within a detection window $Dw_{n-1}$ for servo sector $S_{n-1}$; and means for writing the data block to the target data region after detection of the defective servo sector Sn, wherein the data block is written to the target data region following the defective servo sector $S_n$ based on the detected field within the servo sector $S_{n-1}$, and the timing means enables a timer interval for detection of a second detection window $Dw_{n+1}$ for detecting a field in the servo sector $S_{n+}1$, and if the field in the servo sector $S_{n+1}$ is detected within the second detection window $Dw_{n+1}$, the disk control system marks the data block as being successfully written.

13. The disk drive of claim 12, wherein the data block is written to the target data region following the detecting means detecting the defective servo sector $S_n$ including the timing means setting a timing interval to enable a detection window $Dw_n$ for detecting a field within the defective servo sector $S_n$, and after the timing interval has expired without detection of the field within the detection window $Dw_n$, the disk control system generates a field timeout signal, and the data block is written in the target data region based on the field timeout signal.

14. The disk drive of claim 12, further comprising:

means for verifying that the defective servo sector $S_n$ is defective due to a defective sector.

15. The disk drive of claim 14, wherein the means for verifying includes retrying execution of the command to perform a write operation to write the data block to the target data region.

16. The disk drive of claim 12, wherein the means for detecting the defective servo sector detects a field within the detection window $Dw_{n-1}$ for servo sector $S_{n-1}$, the timing means sets a timing interval to enable a detection window $Dw_n$ for detecting a field within the defective servo sector $S_n$, and the disk control system generates a field timeout signal after the timing interval has expired without detection of the servo sync word within the detection window $Dw_n$.

17. The disk drive of claim 16, wherein the first detection window $Dw_{n+1}$ is longer in duration than the detection window $Dw_n$.

18. The disk drive of claim 12, wherein the first detection window $Dw_{n+1}$ is longer in duration than the second detection window $Dw_{n+1}$.

19. The disk drive of claim 18, wherein the second detection window $Dw_{n+1}$ has the same duration as the detection window Dwn.

20. The disk drive of claim 12, wherein the detection window $Dw_{n-1}$ and the detection window $Dw_n$ have the same duration.

21. The disk drive of claim 12, wherein the field is a servo sync word.

* * * * *